Patented May 4, 1954

2,677,687

UNITED STATES PATENT OFFICE 2,677,687

N-(4-METHOXYBENZYL) ISOQUINOLINIUM CHLORIDE

Alexander R. Surrey, Albany, and Royal A. Cutler, Troy, N. Y., assignors to Sterling Drug Inc., New York, N. Y., a corporation of Delaware No Drawing. Application July 11, 1951,
Serial No. 236,286

2 Claims. (Cl. 260—286)

This invention relates to N-(4-methoxybenzyl)-isoquinolinium chloride having the formula

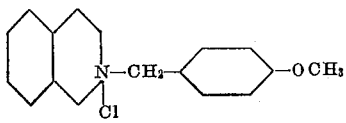

This compound possesses valuable pharmacological properties, for instance, antifibrillatory properties.

The compound was prepared by heating isoquinoline with 4-methoxybenzyl chloride, as illustrated in the following examples.

Example 1

117 g. of 4-methoxybenzyl chloride was added dropwise with stirring over a period of fifteen minutes to a refluxing solution of 93 g. of isoquinoline (freshly distilled) dissolved in 350 cc. of acetonitrile. Refluxing was continued for one hour and the dark reddish-colored solution was allowed to stand overnight. The product which separated was collected and washed with acetonitrile until the washings were colorless, thereby yielding 120 g. (56% of a light cherry-colored product, M. P. 215° C. Two recrystallizations from isopropanol (1.4 liters each time) gave 90 g. of a colorless solid melting at 214–216° C. A sample of this product, N-(4-methoxybenzyl)isoquinolinium chloride, when recrystallized from isopropanol for analysis melted at 222–223.4° C. (corr.).

Anal.—Calcd. for $C_{17}H_{16}ClNO$: C, 71.45; H, 5.64; N, 4.90. Found: C, 71.53; H, 5.65; N, 5.18.

Example 2

Following the procedure described in Example 1, using the same quantities of reactants, but using acetone as the solvent and a reflux period of ten minutes, the yield of crude N-(4-methoxybenzyl)isoquinolinium chloride was 50%. However, the filtrate and acetone washings yielded another crop of this compound (30 g.) after standing at room temperature for five days.

Example 3

When the procedure described in Example 1 was modified by adding the 4-methoxybenzyl chloride at 35° C. and stirring the reaction mixture at this temperature for seventy-two hours the yield of N-(4-methoxybenzyl)isoquinolinium chloride, M. P. 217–219° C., was 60.5%.

We claim:

1. N-(4-methoxybenzyl)isoquinolinium chloride.

2. The process of preparing N-(4-methoxybenzyl)isoquinolinium chloride which comprises treating isoquinoline with 4-methoxybenzyl chloride.

References Cited in the file of this patent

UNITED STATES PATENTS

| Number | Name | Date |
|---|---|---|
| 2,131,244 | Williams | Sept. 27, 1938 |
| 2,499,214 | De Benneville et al. | Feb. 28, 1950 |

FOREIGN PATENTS

| Number | Country | Date |
|---|---|---|
| 684,432 | Germany | Nov. 28, 1939 |
| 965,160 | France | Feb. 8, 1940 |

OTHER REFERENCES

Baker: J. Chem. Soc. (London) 1932, pp. 2631–2636.